(12) United States Patent
Murata et al.

(10) Patent No.: US 6,454,489 B1
(45) Date of Patent: Sep. 24, 2002

(54) NO$_X$ REMOVING PAVEMENT STRUCTURE

(75) Inventors: Yoshihiko Murata; Kiyoshi Kamitani; Hideo Tawara; Hiroshi Obata; Yutaka Yamada, all of Omiya (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/147,539

(22) PCT Filed: Aug. 11, 1997

(86) PCT No.: PCT/JP97/02797

§ 371 (c)(1),
(2), (4) Date: Nov. 24, 1999

(87) PCT Pub. No.: WO98/07929

PCT Pub. Date: Feb. 26, 1998

(30) Foreign Application Priority Data

Aug. 16, 1996 (JP) .............................................. 8-216337
Apr. 25, 1997 (JP) .............................................. 9-108770
Jul. 23, 1997 (JP) .............................................. 9-197096

(51) Int. Cl.[7] .............................................. B01D 53/88
(52) U.S. Cl. ........................................ 404/17; 404/27
(58) Field of Search ............................. 404/17, 27, 30, 404/45, 70; 428/44, 141; 52/177

(56) References Cited

U.S. PATENT DOCUMENTS

| 3,615,787 A | * | 10/1971 | Teramoto ..................... 106/102 |
| 4,066,471 A | * | 1/1978 | Burke ......................... 106/104 |
| 4,218,260 A | * | 8/1980 | Matzler ....................... 106/98 |
| 4,251,586 A | * | 2/1981 | Marzocchi et al. .......... 428/220 |
| 4,769,356 A | * | 9/1988 | Takeuchi ..................... 502/242 |
| 5,082,501 A | * | 1/1992 | Kurz ........................... 106/789 |
| 5,120,367 A | * | 6/1992 | Smith et al. ................. 106/823 |
| 5,192,366 A | * | 3/1993 | Nishioka et al. ............ 106/724 |
| 5,223,031 A | * | 6/1993 | Sugi et al. .................... 106/277 |
| 5,367,007 A | * | 11/1994 | Richards ....................... 524/59 |
| 5,376,705 A | * | 12/1994 | Leys et al. ................... 523/417 |
| 5,492,565 A | * | 2/1996 | Fujimasu ..................... 106/718 |
| 5,494,513 A | * | 2/1996 | Fu et al. ..................... 106/672 |
| 5,554,352 A | * | 9/1996 | Jaques et al. ............... 423/339 |
| 5,651,816 A | * | 7/1997 | Kabayashi et al. ....... 106/38.35 |
| 5,861,205 A | | 1/1999 | Murata et al. .............. 428/141 |
| 5,941,656 A | * | 8/1999 | Sugiyama et al. ............ 404/20 |
| 6,071,039 A | * | 6/2000 | Ogura et al. .................. 404/32 |
| 6,113,684 A | * | 9/2000 | Kunbargi ..................... 106/692 |
| 6,153,162 A | * | 11/2000 | Fetzer et al. ............. 423/239.1 |
| 6,171,655 B1 | * | 1/2001 | Shintome ................. 427/397.7 |

FOREIGN PATENT DOCUMENTS

EP          0786283     * 7/1997    ........... B01D/53/88

* cited by examiner

*Primary Examiner*—Thomas B. Will
*Assistant Examiner*—Kristine Markovich
(74) *Attorney, Agent, or Firm*—Oblon, Spivak, McClelland, Maier & Neustadt, P.C.

(57) ABSTRACT

The NO$_x$-cleaning paving structure of the present invention comprises a concrete base layer 1, a paving layer 2 and a surface layer 3 as illustrated in FIG. 1. The surface layer 3 comprises 100 parts by weight of cement, 5–50 parts by weight of titanium oxide powder and 100–700 parts by weight of aggregate, by which the surface layer on the paving layer can be provided with an NO$_x$-cleaning action and an excellent durability. In addition, pozzolan materials, particularly a blast furnace slag, or adsorbing materials can be added to the surface layer. The paving layer 2 comprises an asphalt paving 21 or a concrete paving 6, both of which may include the used paving layers. It is preferable that the asphalt paving is porous and the surface thereof has an unevenness. Additionally, it is preferable that the thickness of the surface layer is 1–300 mm for the concrete paving and 2–15 mm for the asphalt paving. Among cement, injection cement for half-flexible paving is preferable.

17 Claims, 1 Drawing Sheet

$NO_x$ REMOVING PAVEMENT STRUCTURE

TECHNICAL FIELD

The present invention relates to an $NO_x$-cleaning paving structure, and more particularly to an $NO_x$-cleaning paving structure in which a $NO_x$-cleaning action and an excellent durability are provided to the surface layer of a paving layer or a surface layer constructed by Overlay method for a paving layer.

BACKGROUND ART $NO_x$ is present in exhaust gas discharged from automobiles, particularly diesel motorcars. Air pollution caused by $NO_x$ has increased because of the increasing number of automobiles in use, because of increased traffic congestion, and the like.

Known $NO_x$ concentration-lowering materials include metal oxides, of which titanium oxide, more particularly titanium dioxide is known to have a strong photocatalytic action.

Research into removing $NO_x$ by the strong photocatalytic action has been more active nowadays. For example, the removal of $NO_x$ by using the external walls of buildings constructed of sheets or panels which incorporate titanium dioxide therein is nearing the commercial stage.

Under the above-mentioned situation, the present inventors have filed the patent applications of HEI 8-38137, HEI 8-58945, HEI 8-113507 and HEI 8-126659 relating to $NO_x$-cleaning materials having titanium oxide in cement from the standpoint that a chemical stability is required for materials by which titanium oxide is held since titanium dioxide has a strong photoactivity.

The present inventors have now found that the following advantages can be obtained when $NO_x$-cleaning materials are used as a surface layer provided to a road surface.

(1) The surface of road has many chances to be attacked by sunlight and rain as the surface thereof is flat with result that great effects are obtained for cleaning capability and refreshing.

(2) Paving layers can be simultaneously exchanged as a public office controls roads.

(3) As distances between roads and automobiles are short, an efficiency of contact with an exhausting gas including $NO_x$ is high.

Though there was proposed a plan of holding titanium oxide in asphalt in case of asphalt paving of paved roads, the asphalt used for general roads has a defect of deterioration cased by the photocatalytic action as well as a defect of a low $NO_x$-cleaning capability.

In case of concrete paving, though can be made an $NO_x$-cleaning structure having titanium oxide in the whole of the concrete, a large quantity of expensive titanium oxide is used, which is economically undesirable.

Considering the above-mentioned situation, in the former case of asphalt paving, the present inventors have found that a paved road without deterioration of asphalt and having an excellent durability can be obtained by providing an asphalt surface with a dough of cement and titanium oxide added thereinto, not by adding directly titanium oxide to asphalt to hold the titanium oxide in the asphalt and have found that by adopting porous asphalt, $NO_x$-cleaning materials are penetrated into pores of porous asphalt with the result that an increased durability can be obtained.

In the latter case of concrete paving, the inventors have found that the expensive titanium oxide can be efficiently used either by providing a surface layer including titanium oxide on the concrete paving or by providing a surface layer including titanium oxide on a used concrete paving arranged by concrete overlay method.

The present invention has been carried out, based on the above-mentioned findings.

Accordingly, one object of the present invention is to provide an $NO_x$-cleaning paving structure having a surface layer on a paving layer which is excellent in an $NO_x$-cleaning action and durability.

Another object of the present invention is to provide an $NO_x$-cleaning paving structure having a surface layer which is provided on a paving layer by overlay method and excellent in an $NO_x$-cleaning action and durability.

DESCRIPTION OF THE INVENTION

The above-mentioned objects of the present invention are achieved by each of the following inventions (1) to (16).

Throughout the specification and the claims, the term "for paving purposes" includes within its scope the "paving sideways or roadways". The $NO_x$-cleaning paving structure of the present invention is provided with the following excellent effects.

(1) The basic $NO_x$-cleaning paving structure of the present invention comprises a paving layer and a surface layer in order, the surface layer being obtained from 100 parts by weight of cement, 5–50 parts by weight of titanium oxide powder, 100–700 parts by weight of aggregate and 5–100 parts by weight of water. As the surface layer contains both cement and titanium oxide, the paving having an $NO_x$-cleaning capability and an excellent durability is available.

(2) In the invention described in the above-mentioned (1), by adopting the paving layer composed of asphalt paving, the surface layer including titanium oxide is provided on the asphalt layer with the result that the asphalt layer is not deteriorated by titanium oxide, and as the surface layer contains cement, the surface layer is excellent in durability.

(3) In the invention described in the above-mentioned (1), titanium oxide can be contained only in the surface layer by adopting the paving layer composed of concrete paving, thereby to use expensive titanium oxide efficiently. Furthermore as the structure has the surface layer containing cement on the concrete paving, the concrete paving and the surface layer are strongly adhered each other, thereby to form paving having an enhanced durability.

(4) In the invention described in the above-mentioned (1), by adopting the paving layer composed of a part of used asphalt paving, there are available the effects of the present invention described in the above-mentioned (2) as well as it is not necessary to form again the paving from the beginning as the surface of the used asphalt paving is shaved off by overlay method and the surface including cement and titanium oxide is formed on the shaved part. Accordingly excellent effects can be gained in the points that the term of work is shortened and the cost becomes small.

(5) In the invention described in the above-mentioned (1), by adopting the paving layer composed of a part of concrete paving, there are available the effects of the present invention described in the above-mentioned (3) as well as it is not necessary to form again the paving from the beginning as the surface of the used concrete paving is shaved off by well-known concrete overlay method and the surface layer including cement and titanium oxide is formed on the shaved part.

Accordingly excellent effects can be gained in the points that the term of work is shortened and the cost becomes small.

It goes without saying that the surface properties of the used paving layer can be recovered and the structure thereof can be strengthened.

(6) In the invention described in any of the above-mentioned (1) to (5), sunlight penetration is possible by limiting the thickness of the surface layer to from 1 to 300 mm and the catalytic reaction of titanium oxide can be performed efficiently.

(7) In the invention described in any of the above-mentioned (1) to (6), the work can be carried out efficiently by forming the surface layer using a dough including a high-performance reduction-water agent as the fluidity of the dough is improved in the work.

(8) In the invention described in any of the above-mentioned (1) to (7), the bending property and strength of the surface layer are afforded by forming the surface layer having 0.1 to 50 parts by weight of fiber, with the result that the enhanced durability of the paving is available.

(9) In the invention described in any of the above-mentioned (2), (4) or (6) to (8), a strong base layer for the asphalt layer is available by providing the asphalt layer with the base layer made of concrete, with the result that the paved road excellent in durability is available.

(10) In the invention described in any one of the above-mentioned (2), (4) or (6) to (8), a strong base layer for the asphalt layer is available by providing the asphalt layer with the base layer comprising a rock bed, with the result that the paved road excellent in durability is available.

(11) In the invention described in any of the above-mentioned (2), (4) or (6) to (8), the paving work cost is small and the work can be carried out efficiently by forming the base layer for asphalt comprising at least one selected from soil, macadam and stone, and the paved road formed has an $NO_x$-cleaning capability corresponding to that of the paved road having the concrete base layer.

(12) In the invention described in any of the above-mentioned (2), (4) or (6) to (8), a part of the surface layer is penetrated into pores of a porous asphalt layer in the paving work by providing the asphalt layer which is porous, with the result that the surface layer and the asphalt layer are strongly adhered each other and the paving excellent in durability is available.

(13) In the invention described in any of the above-mentioned (1) to (12), the surface layer is strongly adhered by proving the surface of the paving layer with an unevenness with the result that the surface layer is excellent in durability, by which excellent effects are obtained for the paving of roadways.

(14) In the invention described in any one of the above-mentioned (1) to (13), the surface layer is enhanced in strength and a water seal thereof is increased by adding 10–50% by weight of an admixing additive comprising a pozzolan material relative to cement to form the surface layer with the result that the surface layer is enhanced in durability and in addition, there are available excellent effects such as strong resistance to an acid circumstance.

(15) In the invention described in any of the above-mentioned (1) to (13), a hydrant reaction is made dull by adding 10–50% by weight of an admixing additive comprising a blast furnace slag having a powder value less than 4000 $m^2/g$ relative to cement to form the surface layer.

(16) In the invention described in any of the above-mentioned (1) to (15), by adding 2–30% by weight of an adsorbing material relative to cement to form the surface layer, the following excellent effects are available: $NO_x$ is decomposed and removed by sunlight of days(ultraviolet rays included in sunlight) as well as $NO_x$ is adsorbed by the adsorbing material during nights and is decomposed by ultraviolet rays with the result of removing $NO_x$.

BEST MODES OF PRACTICING THE INVENTION

Figure 1:
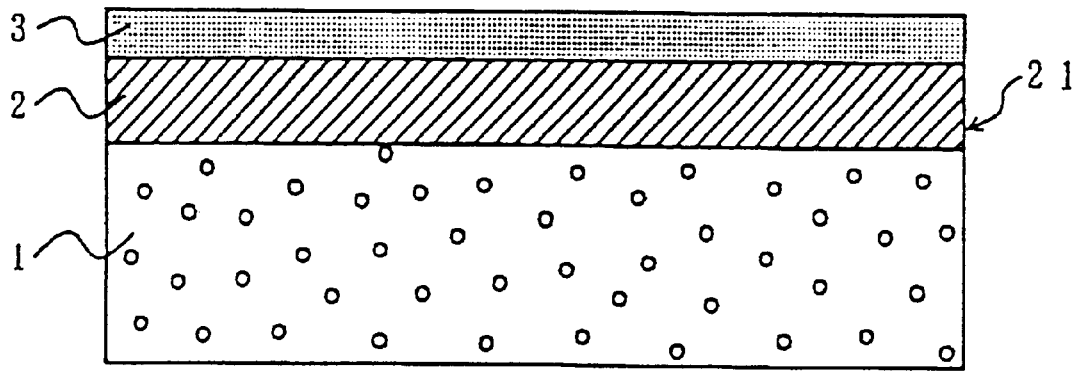
FIG. 1 is a cross-sectional view of an $NO_x$-cleaning paving structure of asphalt of the present invention.

While the embodiments of the present invention are described below further in detail showing examples, the present invention is not limited to the described embodiments.

The $NO_x$-cleaning paving structure of the present invention is characterized by comprising in order a paving layer and a surface layer which is obtained from 100 parts by weight of cement, 5–50 parts by weight of titanium oxide powder, 100–700 parts by weight of aggregate and 5–100 parts by weight of water.

The paving layer includes asphalt paving and concrete paving. The asphalt paving is formed by known construction methods of asphalt roads.

As the examples of forming the asphalt roads, there is a method of forming the asphalt layer of the present invention on a concrete base layer, anther method of providing a styrofoam layer and forming the asphalt layer of the present invention on the styrofoam layer, still another method of forming directly the asphalt layer of the present invention on the worked surface of a road, namely the worked soil surface which is a base layer, still another method of forming the asphalt layer of the present invention on gravel, stone or the like laid as a base layer. The above-mentioned methods of forming the asphalt roads are selected from ones used in this technical field.

Though asphalt for asphalt paving is not limited, in cases where asphalt is used on the concrete base layer, asphalt suitable for the concrete base layer should be selected and improved asphalt is preferable. The mother asphalt mixture of half-flexible paving materials has 20–28% of vacancy. Accordingly porous asphalt paving is available.

Special cement such as injection cement for half-flexible paving is preferable as the cement can be hardened early. In addition sand is added to the cement.

One example of the concrete paving comprises, in order on a roadbed, a macadam roadbed, an asphalt interlayer and a concrete layer. The construction method is well known in the technical field of concrete paving. The overlay construction method in the present invention includes a method for used asphalt paving and a method for used concrete paving. Among the two methods, a great construction effect is available especially for the used concrete paving.

Generally, the concrete overlay method is used for recovering the surface properties of the used concrete paving or strengthening the structure thereof. Concretely, the concrete overlay method is carried out by shaving the used concrete plate and then sticking-treatment, followed by constructing a determined thickness of new concrete by tapping.

According to the present invention, the surface layer of the new concrete is obtained from 100 parts by weight of cement, 5–50 parts by weight of titanium oxide powder, 100–700 parts by weight of aggregate and 5–100 parts by weight of water. It is preferable to grind the shaved face of the used concrete paving with a method such as shotblast, followed by cleaning the ground face so as to reliably adhere the used concrete paving and the surface layer.

According to the present invention, a sheet for preventing a refraction crack or a stress-relief layer or the like may be provided between the surface layer and the concrete layer to decrease the refraction crack. The sheet and the stress-relief layer prevent the refraction crack as well as have a cleaning action of the concrete layer attributable to rainwater.

The types of adherence between the used concrete paving and the surface layer thereof comprise adhesion type, half-adhesion type, non-adhesion type or the like. The adhesion type is preferable as the finishing height is limited.

According to the present invention, the cement for the surface layer may be conventional cement which includes normal Portland cement, high early strength Portland cement, super high early strength Portland cement, injection cement for half-flexible paving, moderate heat Portland cement, white cement, Portland blast furnace slag cement, alumina cement, low heat cement, superfast-setting cement, etc. Among them, the white cement is preferable as the cleaning efficiency thereof is high. Additionally a center line formed by white cement has an $NO_x$-cleaning capability as well as is excellent in easy recognition thereof.

Inorganic admixing additives such as pozzlan materials, Portland blast furnace slag cement or the like as well as organic admixing additives or additives ordinarily used in the technical field may be added to the mixture for forming the surface layer used in the present invention if necessary. The pozzolan materials are added by 10–50 weight % relative to cement.

The pozzolan materials or the pozzolan are compositions which are rich in silicon dioxide and alumina having the property of reacting with calcium hydroxide or calcium ion in the presence of water to generate new hydrates and which include artificial pozzolan such as fly ash, blast furnace slag, silica fume, chaff ash or the like and natural pozzolan originated in Siras white clay, volcanic ash.

The pozzolan reaction is a reaction which generates new hydrates from pozzolan and calcium hydroxides or calcium ion. Though the hydrates generated by the pozzolan reaction are substantially the same as in Portland cement, the reaction is apt to generate hydrates having a low calcium content. The pozzolan materials content less than 10% by weight relative to cement is not sufficient to promote hardening, whereas the pozzolan materials content more than 50% by weight relative to cement lowers the cement content relatively by which initial strength attainment becomes aggravated.

In addition, in the present invention, in cases where an admixing additive for the surface layer is a blast furnace slag, the powder value of the slag is preferably less than 4000 m$^2$/g. The amount of the slag relative to cement is 10–50% by weight which is the same as that of the said pozzolan materials.

In the present invention, the titanium oxide for the surface layer is preferably a powder which is not surface-treated. The particle size of the powder is preferably fine and the specific surface of the same is preferably more than 5 m$^2$/g, more preferably 100–300 m$^2$/g. In the present invention, any titanium oxide is preferable as the same is provided with a cleaning action, anatase type is more preferably.

Titanium oxide showing 5–20% of weight loss comprising mainly moisture relative to titanium oxide when the titanium oxide is calcined in the rage of 150–800° C. is easy to be mixed with cement, more preferably 8–15% of the weight loss.

Also, the kinds of titanium oxide are not limited, titanium monoxide and titanium dioxide can be used individually or in a mixed combination. In place of these titanium oxides, metatitanic acid, orthotitanic acid or the like which are intermediates can be used.

In the present invention, the amount of titanium oxide for forming the surface layer, though depending on the types, particle sizes, etc. thereof, is 5–50 parts by weight of titanium oxide powder relative to 100 parts by weight of cement, preferably 15–30 parts by weight of titanium oxide powder and more preferably 10–40 parts by weight of titanium oxide powder.

In cases where the amount of titanium oxide powder in the surface layer of the present invention is less than 5 parts by weight relative to 100 parts by weight of cement, the $NO_x$-cleaning efficiency is inferior, whereas not only the anti-slip property is reduced but also the wear resistance is reduced in cases of exceeding 50 parts by weight.

In cases where the amount of aggregate is less than 100 parts by weight relative to 100 parts by weight of cement, the anti-slip property and the wear resistance are reduced, whereas in cases of exceeding 700 parts the amount of titanium oxide is relatively reduced with the result of impairing the $NO_x$-cleaning efficiency. The composition of the surface layer of the present invention preferably comprises 10–50 parts by weight of titanium oxide powder, more preferably 20–50 parts , and 50–300 parts by weight of aggregate, each relative to 100 parts by weight of cement.

Two kinds of coarse aggregate and fine aggregate can be used for preparing the surface layer of the present invention. The coarse one is preferably up to 20 mm ,and gravel and crashed stones may be used, for examples. The preferable fine one is sand. In cases where glass grains or silica sand having a high light-transmissivity are used as the sand, sufficient light can deeply penetrate from surface, thereby to provide an enhanced $NO_x$-cleaning efficiency. The grain size of the sand is preferably 1.2–5 mm.

The dough used for the surface layer of the present invention includes a high-performance reduction-water agent. The reduction-water agent may be conventional one. In cases of the high condensation products of naphthalene-sulfonic acid, β-naphthalenesulfonic acid-formaldehyde condensation product or the like, for examples, may be used. In cases of the high condensation products of melamine-sulfonic acid, melaminesulfonic acid-formaldehyde condensation product or the like, for examples, may be used.

Furthermore, denatured lignin derivatives, creosote oils group materials, polymers of alkylallylsulfonate or polycarboxyl acid group materials one example of which is oxycarboxyl acid may be used.

Incidentally, fibers for preparing the surface layer of the present invention include vinylon fibers, carbon fibers, plastic fibers, steel fibers, etc. Among the fibers, plastic fibers and steel fibers are preferable, and steel fibers are more preferable.

In the present invention, active carbon, zeolite, silica gel powder, Magadiite, petalite, etc. are used as adsorbing materials for the surface layer. Among the adsorbing materials, active carbon is most preferable from the stand point of adsorbing effect. Zeolite is also confirmed to have a high adsorbing effect and is preferable for the surface layer.

Any of natural and artificial zeolite can be used. The amount of adsorbing materials which is 2–30%, more preferably 7–25% by weight relative to cement results in decomposing and removing $NO_x$ during day by sunlight (ultraviolet rays included in the sunlight) under the action of titanium oxide.

Furthermore, during night $NO_x$ is adsorbed by the adsorbing materials and during day the adsorbed $NO_x$ is decomposed and removed by ultraviolet rays. If the amount of adsorbing materials is less than 5% by weight, the adsorptive effect is not sufficient and the adsorption is imperfect during night having no sunshine.

On the other hand, if the amount of adsorbing materials is more than 30% by weight, it increases cost, and the relative amount of cement and titanium oxide decreases with the result of decreasing strength and cleaning efficiency. Incidentally "% by weight" may be represented by "ratio relative to 100 weight parts by weight".

Other additives which includes resin emulsion, re-emulsified powder resin, AE reagent or the like can be used to increase the fluidity and adhesiveness of the dough.

In cases where the paving layer is concrete paving or used concrete paving in overlay method in the present invention, the surface layer thickness is 1–300 mm, preferably 20–150 mm and more preferably 40–80 mm.

In cases where the paving layer is asphalt paving (half-flexible paving) or used asphalt paving, the surface layer thickness is 2–15 mm, preferably 2–10 mm. The surface layer can be formed on the asphalt layer completely or partially.

According the present invention, in cases where the surface layer thickness is more than 300 mm, sunlight is hard to penetrate and the titanium oxide layer is useless. On the other hand, if the surface layer thickness is less than 1 mm, $NO_x$-cleaning efficiency is reduced and durability is impaired.

According to the present invention, it is preferable that the surface of paving layer is provided with an unevenness. The unevenness may be any patterns such as streaks, meshes, and embossed patterns. The strong adhesion between the paving layer and the surface layer is available by the unevenness.

According to the present invention, embodiments of road paving comprise a paving layer which is asphalt paving or concrete paving and a surface layer containing cement and titanium oxide formed on the paving layer. In cases where the paving layer is composed of a part of used asphalt paving, overlay method is adopted in such a manner that the repaired parts of the surface of the used asphalt paving are shaved to expose new surfaces. Accordingly, after the new surfaces are exposed on the used asphalt paving, surface layers which include cement and titanium oxide are formed on the new surfaces.

On the other hand, in cases where the paving layer is composed of a part of used concrete paving, concrete overlay method is adopted in such a manner that the repaired parts of the surface of the used concrete paving are shaved to expose new surfaces.

Accordingly, after the new surfaces are exposed on the used concrete paving, surface layers which include cement and titanium oxide are formed on the new surfaces.

According to the present invention, under the paving layer can be used a base layer which comprises concrete, rock bed or at least one selected from soil, macadam and stone. Concretely, when the paving layer is an asphalt layer, the concrete base layer or the rock bed can be used as the base layer, and also at least one selected from soil, macadam and stone can be used as the base layer.

Similarly, when the paving layer is a concrete paving, the concrete base layer or the rock bed can be used as the base layer, and also at least one selected from soil, macadam and stone can be used as the base layer.

The $NO_x$-cleaning paving structure of the present invention is especially preferred to be formed near places where exhaust gas is discharged from automobiles and concretely, can be formed on roadways and sideways. Accordingly, it is characterized that $NO_x$ can be cleaned immediately after the discharge of the exhaust gas by forming the $NO_x$-cleaning paving structure on roadways and sideways. In comparison with other construction materials used on the walls of buildings, the $NO_x$-cleaning paving structure of the present invention can efficiently clean $NO_x$ to obtain a high $NO_x$-cleaning effect.

In the present invention, as the surface layer containing cement and titanium oxide is formed on the asphalt layer, the asphalt layer is not deteriorated by titanium oxide, and as the surface layer contains cement, the durability thereof is excellent.

Particularly in cases where the asphalt layer is porous asphalt paving, a part of the surface layer penetrates into the pores of the porous paving during construction with the result of strongly adhering the surface layer and the asphalt layer and providing paving which has an increased durability.

Furthermore in cases where the asphalt paving is one already used, the construction cost and the construction term are decreased as the construction of paving layer is only to change a part of the asphalt layer.

Additionally the surface layer is strongly adhered by providing an unevenness to the surface of asphalt layer with the result of obtaining an excellent durability. Furthermore the good durability and stability of a road is available by using a concrete base layer. The surface layer containing pozzolan materials can obtain an excellent strength as a hydrate is filled in voids. In cases where the surface layer contains adsorbing materials, an excellent $NO_x$-cleaning efficiency is available as $NO_x$ is adsorbed during night and decomposed during day by sunlight.

In the present invention, as the surface layer containing cement and titanium oxide is formed on the concrete paving, the surface layer is provided with $NO_x$-cleaning activity as well as the surface layer and the concrete layer are strongly adhered each other as the materials thereof are the same kind with the result that an excellent durability is available.

In addition, is cases where the concrete paving is used concrete paving, the surface of the paving is easily repaired as concrete overlay method is used and also the surface on the used concrete paving can be provided with $NO_x$-cleaning capability.

Accordingly, it is easy to construct paving which has $NO_x$-cleaning capability as well as the cost and term of the construction can be decreased.

EXAMPLES

A further detailed description is shown hereinafter by reference to specific examples which are provided herein for purposes of illustration only and are not intended to be limiting unless otherwise specified.

Example 1

In FIG. 1, a 4-cm-thick interlayer (is not shown) and a 45-cm-thick concrete layer 1 were formed on a particle size-controlled macadam roadbed, and a rubber-contained asphalt emulsion was spread on the concrete layer as a tack coat and then a half-flexible paving material 21 comprising a mother-asphalt mixture having a void volume of 23% was laid and next roll-pressed by roller, thereby to form a paving layer 2.

After that, a slurry as a dough for surface layer was prepared by arranging and kneading a mixture comprising 240 parts by weight of sand, 20 parts by weight of titanium oxide, 80 parts by weight of Portland cement and 40 parts by weight of water. After the temperature of the mother-asphalt mixture fell to a predetermined value, the slurry was applied to the surface of the paving layer, thereby to form a surface layer 3. A part of the slurry penetrated into the pores of the porous asphalt.

The thickness of the surface layer of paving structure formed in this way was 8–10 mm. A high $NO_x$-cleaning effect was obtained in the above-mentioned road paving due to the $NO_x$-cleaning action of the surface layer 3.

In addition, the adhesion between the asphalt layer 21 and the surface layer 3 was satisfactory and an abrasion loss by labeling test was 0.4 cm² which demonstrated the excellent durability of the paving.

Example 2

An ascon was prepared by mixing and heating 94 parts by weight of particle size-controlled macadam and 6 parts by weight of asphalt. The ascon was laid on a road and was roll-pressed by roller to form asphalt paving. A slurry was prepared by mixing 70 parts by weight of Portland cement, 15 parts by weight of titanium dioxide, 70 parts by weight of sand, 70 parts by weight of water and 0.1 parts by weight of Mighty-150 (Trade mark). The slurry was spread on the asphalt layer, followed by leveling the same to form road paving. A high $NO_x$-cleaning effect was obtained in the above-mentioned road paving due to the $NO_x$-cleaning action of the surface layer.

In addition, the adhesion between the asphalt layer and the surface layer was satisfactory and paving excellent in durability was obtained. In addition, another road paving was prepared by replacing Portland cement with white cement, which demonstrated that the road paving replaced with white cement had more excellent $NO_x$-cleaning ability than the road paving formed by using normal Portland cement.

Additionally, a center line was formed by using white cement, which demonstrated a higher $NO_x$-cleaning effect.

Example 3

Figure 2:
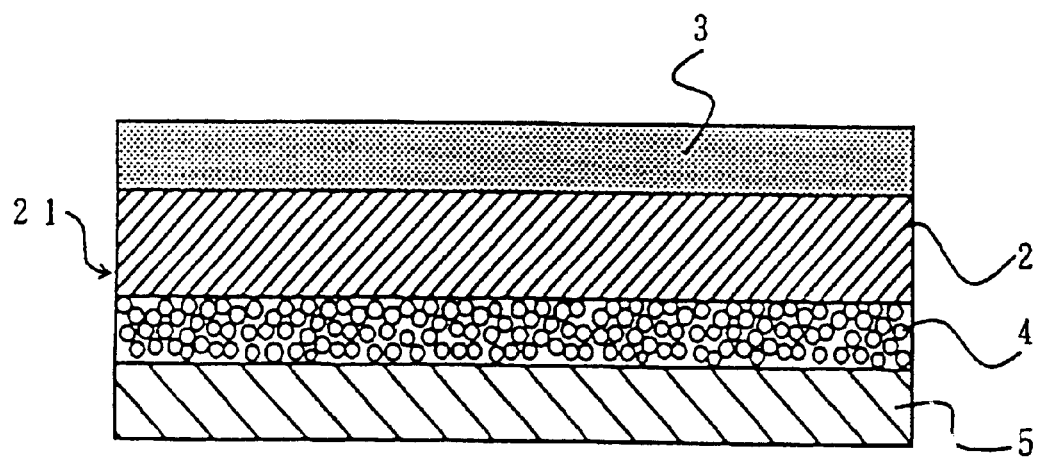
FIG. 2 is a cross-sectional view of another $NO_x$-cleaning paving structure of the present invention.

An ascon was prepared by mixing and heating 94 parts by weight of particle size-controlled macadam and 6 parts by weight of asphalt. As illustrated in a cross-sectional view of FIG. 2, a paving layer 2 was prepared by laying the ascon on a particle size-controlled macadam roadbed 4 formed on a roadbed 5, followed by roll-pressing the same by roller to form an asphalt paving 21. The slurry of Example 2 containing titanium dioxide was spread on the formed asphalt paving 21, followed by leveling the same to form road paving. The surface layer 3 of the road paving formed in this way demonstrated a high $NO_x$-cleaning effect due to the $NO_x$-cleaning action. Also, in cases where stone was used for a base layer in place of the particle size-controlled macadam, the base layer could be used, which demonstrated no unfavorable influence on the $NO_x$-cleaning action of the surface layer 3.

Example 4

A layer comprising a mother-asphalt mixture having a void volume of 23% was prepared and was roll-pressed by roller. Then a slurry was prepared by mixing 90 parts by weight of Hosoh-Acerade mark of injection material for half-flexible paving made by Mitubishi Materials Co.,super-rapidly hardening type), 10 parts by weight of titanium oxide powder and 55 parts by weight of water.

The slurry was spread on the asphalt layer, followed by leveling the same to form road paving. The road paved in this way demonstrated that the excellent $NO_x$-cleaning effect of the present invention was obtained due to the $NO_x$-cleaning action of the surface layer.

Example 5

Each paving structure was provided by adding fly ash or a blast furnace slag as adsorbing materials to the composition of the surface layer of the asphalt paving structure for $NO_x$-cleaning of Example 1.

Each paving structure containing the above-mentioned pozzolan materials demonstrated a high strength.

Example 6

A paving structure was provided by adding active carbon as adsorbing materials to the composition of the surface layer of the asphalt paving structure for $NO_x$-cleaning of Example 1. The above-mentioned paving structure demonstrated an enhanced $NO_x$-cleaning efficiency.

Example 7

Figure 3:
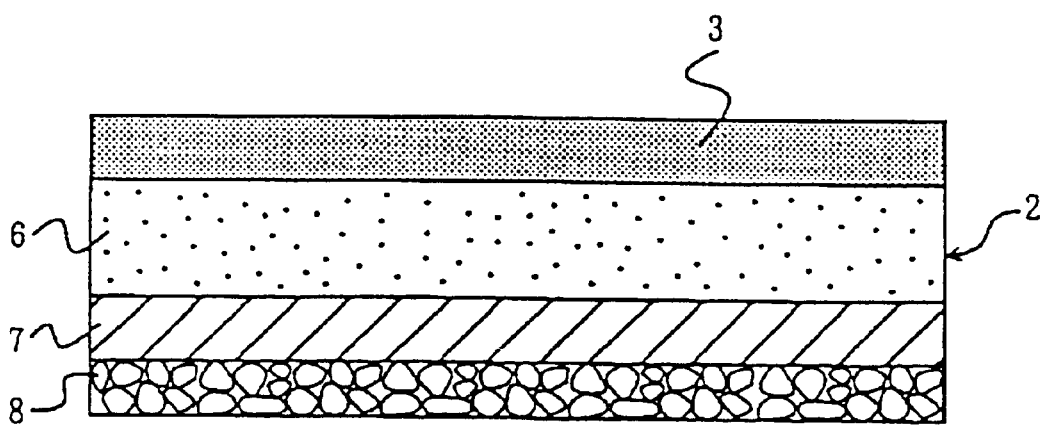
FIG. 3 is a cross-sectional view of still another $NO_x$-cleaning paving structure of the present invention.

The concrete paved road in FIG. 3 is composed of an asphalt interlayer 7 on a macadam roadbed 8, a used concrete paving 6 as a paving layer 2 on the interlayer, and a surface layer 3 containing cement and titanium oxide on the concrete paving.

First, a part of the surface of used concrete paving 6 in a concrete paved road was shaved, followed by abrasion-cleaning the shaved face by shotblast A dough was prepared by mixing the composition listed in Table 1 and the surface layer 3 was formed by covering the abrasion-cleaned face with the dough in 5 cm thickness using a finisher for thin layer paving. After curing, pointing was carried out. Samples were cut off from the resulted paving and tested by the methods mentioned later. The result obtained is shown in Table 1.

Example 8

A part of the surface of used concrete paving in a concrete paved road was shaved, followed by abrasion-cleaning the shaved face by shotblast. A dough was prepared by mixing the composition listed in Table 1 and the abrasion-cleaned face was covered in 7 cm thickness with the dough using a finisher for thin layer paving. After curing, pointing was carried out. Samples were cut off from the resulted paving and tested by the methods mentioned later. The result obtained is shown in Table 1.

Example 9

The surface of used asphalt paving in an asphalt paved road was abrasion-cleaned by shotblast. A dough was prepared by mixing the composition listed in Table 1 and the abrasion-cleaned surface was covered in 3 cm thickness with the dough using a finisher for thin layer paving. After curing, pointing was carried out. Samples were cut off from the resulted paving and tested by the methods mentioned later. The result obtained is shown in Table 1.

NO$_x$-cleaning capability test

Test specimens each having an area of 10 cm×10 cm were cut off from paving surfaces which had completely hardened. The test specimen was ground into 1 cm thickness, put into a glass container and the NO$_x$-cleaning capability thereof was tested.

The test method is as follows. The test specimen was put into a sealed glass container and an imitation gas having an NO$_x$ concentration of 1 ppm was introduced from the inlet of the container. The concentration of the gas flowing out of the outlet of the container was measured and NO$_x$-removal degree was calculated by the following formula.

$$NO_{x-}\text{ removal degree}(\%) = \frac{NO_x \text{ concentration at the inlet} - NO_x \text{ concentration at the outlet}}{NO_x \text{ concentration at the inlet}} \times 100 \quad \text{Formula 1}$$

TABLE 1

| Examples | Portland cement | High early strength cement | Water | Titanium oxide | Fine aggregate | Coarse aggregate | Reduction-water agent | Steel fiber | NOx-cleaning capability (%) |
|---|---|---|---|---|---|---|---|---|---|
| 7 | — | 100 | 50 | 30 | 245 | 169 | 0.4 | — | 82 |
| 8 | 100 | | 48 | 30 | 247 | 206 | 0.4 | — | 85 |
| 9 | — | 100 | 50 | 30 | 245 | 169 | 0.4 | 30 | 87 |

(Unit: parts by weight)

Titanium oxide: Crystal type - anataze, specific surface area - 250 cm$^2$/g

Reduction-water agent: A high-performance reduction-water agent, KAOH Mighty 150

Coarse aggregate: Particle size 5–20 mm

Application Available to Industry

The NO$_x$-cleaning paving structure of the present invention is provided to roadways or sideways in areas where NO$_x$ is found much. Specifically, concrete overlay method is applicable to used paving layers for providing the structure of the present invention and the present invention is used in paved roads construction such as repairing or strengthening surfaces thereof.

What is claimed:

1. An NO$_x$-cleaning paving structure comprising:
a surface layer disposed on an asphalt paving layer, wherein the surface layer is formed from a mixture comprising 100 parts by weight of cement, 5–50 parts by weight of titanium oxide powder, 100–700 parts by weight of aggregate and 5–100 parts by weight of water.

2. The NO$_x$-cleaning paving structure of claim 1, wherein the asphalt paving layer comprises used asphalt paving.

3. The NO$_x$-cleaning paving structure of claim 1, wherein the surface layer has a thickness of 1–300 mm.

4. The NO$_x$-cleaning paving structure of claim 1, wherein the surface layer has a thickness of 40–80 mm.

5. The NO$_x$-cleaning paving structure of claim 1, wherein the mixture is in the form of a dough further comprising a high performance reduction water agent.

6. The NO$_x$-cleaning paving structure of claim 5, wherein the high performance reduction water agent is selected from the group consisting of naphthalenesulfonic acid condensation products, β-naphthalenesulfonic acid-formaldehyde condensation products, melaminesulfonic acid condensation products, melaminesulfonic acid-formaldehyde condensation products, denatured lignin derivatives, creosote oils, polymers of alkylallylsulfonate, polymers of polycarboxylic acid, and mixtures thereof.

7. The NO$_x$-cleaning paving structure of claim 1, wherein the mixture further comprises 0.1–50 parts by weight of a fiber.

8. The NO$_x$-cleaning paving structure of claim 7, wherein the fiber is selected from the group consisting of vinylon fibers, carbon fibers, plastic fibers, steel fibers, and mixtures thereof.

9. The NO$_x$-cleaning paving structure of claim 1, further comprising a concrete base layer disposed beneath the paving layer.

10. The NO$_x$-cleaning paving structure of claim 1, further comprising a rock bed base layer disposed beneath the paving layer.

11. The NO$_x$-cleaning paving structure of claim 1, further comprising a base layer selected from the group consisting of soil, macadam, stone, and mixtures thereof disposed beneath the paving layer.

12. The NO$_x$-cleaning paving structure of claim 1, wherein the asphalt paving layer comprises porous asphalt paving.

13. The NO$_x$-cleaning paving structure of claim 1, wherein the asphalt paving layer has an uneven surface.

14. The NO$_x$-cleaning paving structure of claim 1, wherein the mixture further comprises 10–50% by weight relative to the cement of an admixing additive comprising pozzolan materials.

15. The NO$_x$-cleaning paving structure of claim 1, wherein the mixture further comprises 10–50% by weight relative to the cement of an admixing additive comprising a blast furnace slag having a powder value less than 4000 m$^2$/g.

16. The NO$_x$-cleaning paving structure of claim 1, wherein the mixture further comprises 2–30% by weight relative to the cement of an adsorbing material.

17. The NO$_x$-cleaning paving structure of claim 16, wherein the absorbing materials are selected from the group consisting of active carbon, natural zeolite, artificial zeolite, and mixtures thereof.

* * * * *

UNITED STATES PATENT AND TRADEMARK OFFICE
CERTIFICATE OF CORRECTION

PATENT NO. : 6,454,489 B1
DATED : September 24, 2002
INVENTOR(S) : Murata et al.

It is certified that error appears in the above-identified patent and that said Letters Patent is hereby corrected as shown below:

Column 3,
Line 64, delete "$m^2/g$" and insert -- $cm^2/g$ --

Column 5,
Line 58, delete "$m^2/g$" and insert -- $cm^2/g$ --

Column 11,
Formula 1 should read:

Formula 1

$$\text{NOx-removal degree (\%)} = \frac{\text{NOx concentration at the inlet - NOx concentration at the outlet}}{\text{NOx concentration at the inlet}} \times 100$$

Column 11,
Table 1, after suface area delete "250 $cm^2/g$" and insert -- 250 $m^2/g$ --

Column 12,
Line 58, delete "$m^2/g$" and insert -- $cm^2/g$ --

Signed and Sealed this

Twenty-fourth Day of June, 2003

JAMES E. ROGAN
*Director of the United States Patent and Trademark Office*